(12) United States Patent
Opitz

(10) Patent No.: US 12,325,412 B2
(45) Date of Patent: Jun. 10, 2025

(54) METHOD AND CONTROL UNIT FOR OPERATING A TRANSVERSE STABILIZATION SYSTEM OF A VEHICLE

(71) Applicant: Robert Bosch GmbH, Stuttgart (DE)

(72) Inventor: Sebastian Opitz, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 266 days.

(21) Appl. No.: 17/840,730

(22) Filed: Jun. 15, 2022

(65) Prior Publication Data

US 2023/0052366 A1 Feb. 16, 2023

(30) Foreign Application Priority Data

Aug. 16, 2021 (DE) .................. 10 2021 208 966.6

(51) Int. Cl.
*B60W 30/02* (2012.01)
*G06V 20/56* (2022.01)

(52) U.S. Cl.
CPC .......... *B60W 30/02* (2013.01); *G06V 20/588* (2022.01); *B60W 2420/403* (2013.01); *B60W 2510/20* (2013.01); *B60W 2552/53* (2020.02)

(58) Field of Classification Search
CPC .......... B60W 30/02; B60W 2420/403; B60W 2510/20; B60W 2552/53; G06V 20/588
See application file for complete search history.

(56) References Cited

U.S. PATENT DOCUMENTS

| | | | |
|---|---|---|---|
| 2017/0015323 A1* | 1/2017 | Oguri | B60W 10/08 |
| 2017/0158238 A1* | 6/2017 | Takaso | G05D 1/0246 |
| 2018/0178769 A1* | 6/2018 | Raste | B60T 8/176 |
| 2018/0201317 A1* | 7/2018 | Kudo | B60W 10/20 |
| 2019/0054955 A1* | 2/2019 | Kalabic | B62D 15/025 |
| 2019/0152520 A1* | 5/2019 | Obermüller | B62D 5/008 |
| 2020/0180605 A1* | 6/2020 | Boecker | B60W 10/20 |
| 2020/0255012 A1* | 8/2020 | Sato | B60W 30/16 |
| 2021/0269018 A1* | 9/2021 | Liu | B60W 30/045 |
| 2022/0089149 A1* | 3/2022 | Omori | B60W 10/20 |
| 2022/0281525 A1* | 9/2022 | Öst | B62D 15/025 |

FOREIGN PATENT DOCUMENTS

WO WO-2020157798 A1 * 8/2020

* cited by examiner

*Primary Examiner* — Hunter B Lonsberry
*Assistant Examiner* — Harrison Heflin
(74) *Attorney, Agent, or Firm* — NORTON ROSE FULBRIGHT US LLP

(57) ABSTRACT

A method for operating a transverse stabilization system of a vehicle. A steering direction of the vehicle and a setpoint direction of the vehicle are read in, with a transverse stabilization target for the transverse stabilization system being determined using the steering direction and the setpoint direction.

9 Claims, 1 Drawing Sheet

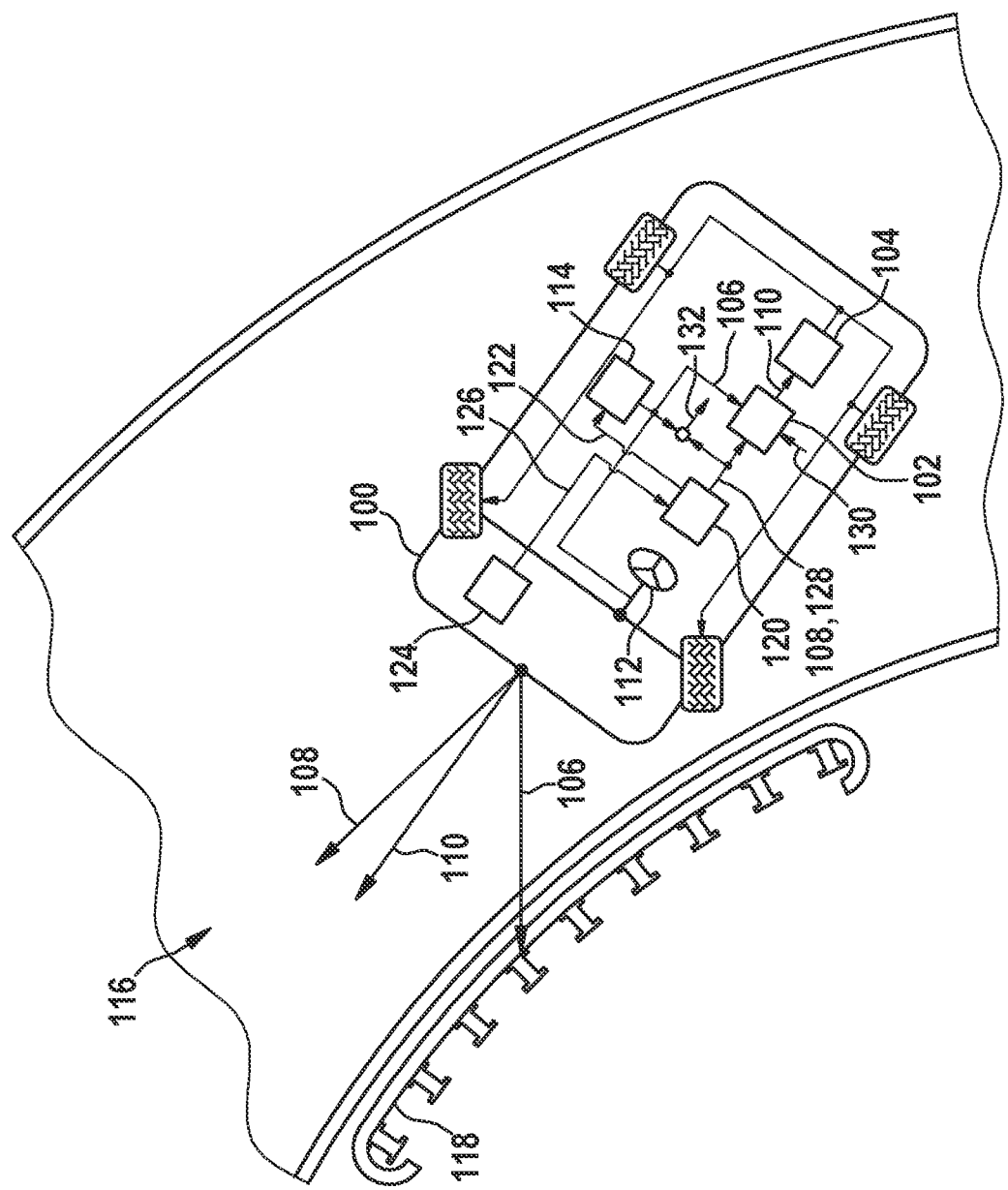

METHOD AND CONTROL UNIT FOR OPERATING A TRANSVERSE STABILIZATION SYSTEM OF A VEHICLE

CROSS REFERENCE

The present application claims the benefit under 35 U.S.C. § 119 of German Patent Application No. DE 10 2021 208 966.6 filed on Aug. 16, 2021, which is expressly incorporated herein by reference in its entirety.

FIELD

The present invention relates to a method for operating a transverse stabilization system of a vehicle and also to a corresponding control unit.

BACKGROUND INFORMATION

A transverse stabilization system of a vehicle can be called an electronic stabilization program (ESP). The transverse stabilization system can control a braking system of the vehicle and/or a drive system of the vehicle in order to stabilize the vehicle in a transverse direction when skidding or sliding sideways. In this case, the braking system and/or the drive system are controlled such that the vehicle as far as possible follows a steering direction of the vehicle.

SUMMARY

A method for operating a transverse stabilization system of a vehicle and also a corresponding control unit in accordance with the present invention are provided. Advantageous developments of and improvements in the present invention will become apparent from the description and the FIGURE.

With a conventional transverse stabilization system, a steering direction, i.e., a steering wheel position or a steering angle requested by an assistance system of the vehicle, is used as the transverse stabilization target. The transverse stabilization target in this case is the direction in which the transverse stabilization system attempts to stabilize the vehicle. In this case, it is assumed that the driver or the assistance system always steers the vehicle in the correct direction. The driver or the assistance system may however steer too hard and thus prescribe a direction that deviates greatly from a safe direction for the vehicle. The driver or the assistance system may, for example because of an overreaction, steer into the oncoming traffic, in the direction of an obstacle and/or in the direction of a road boundary.

In accordance with the present invention, in addition to the steering direction, a safe setpoint direction for a vehicle is also used in order to establish the transverse stabilization target. Specific example embodiments of the present invention may advantageously prevent the transverse stabilization system from contributing to moving the vehicle in an unsafe direction with its interventions in the braking system and/or the drive system. For example, it is thus possible to prevent the vehicle from running off the road, hitting an obstacle or swerving into the oncoming traffic due to the interventions of the transverse stabilization system because the steering direction is incorrectly pointing that way. The vehicle can be stabilized in a safe direction.

In accordance with an example embodiment of the present invention, a method for operating a transverse stabilization system of a vehicle is provided, wherein a steering direction of the vehicle and a setpoint direction of the vehicle are read in, with a transverse stabilization target for the transverse stabilization system being determined using the steering direction and the setpoint direction.

Ideas relating to specific embodiments of the present invention may be regarded, inter alia, as being based on the concepts and findings described below.

A transverse stabilization system of a vehicle can be called an electronic stabilization program (ESP). The transverse stabilization system may control a braking system of the vehicle and/or a drive system of the vehicle using control commands. The transverse stabilization system may be integrated in the braking system. The transverse stabilization system may individually brake and/or accelerate wheels of the vehicle by interventions in order to produce a stabilizing yawing moment about a vertical axis of the vehicle.

In accordance with an example embodiment of the present invention, a transverse stabilization target may be a direction in which the transverse stabilization system attempts to stabilize the vehicle by the interventions. The transverse stabilization target may indicate a desired direction of movement of the vehicle. The transverse stabilization target may for example be an angle relative to a longitudinal vehicle axis. The transverse stabilization target may likewise be a global angle relative to an external coordinate system.

A steering direction may be determined by a steering wheel position of a steering wheel of the vehicle or may correlate therewith. Alternatively or additionally, the steering direction may be determined by a current steering angle adopted by the steered wheels of the vehicle relative to the longitudinal vehicle axis or may correlate therewith. Likewise, the steering direction can be prescribed by an assistance system of the vehicle. If there is no direct coupling between the steering wheel and a steering linkage of the vehicle, the steering direction may also be independent of the steering wheel position. The steering direction may be an angle relative to the longitudinal vehicle axis. The steering direction may likewise be a global angle relative to the external coordinate system.

A setpoint direction may be prescribed by local environmental conditions. In particular, the setpoint direction may be prescribed by a line of the road and any obstacles present. The line of the road can be recognized and the setpoint direction can be derived from the recognized line of the road. The setpoint direction may run for example along a traffic lane. The line of the road or the setpoint direction may be determined using an environment capture system of the vehicle. The environment capture system may have at least one sensor for capturing the line of the road and obstacles. The environment capture system may provide environment data that image the line of the road and the obstacles. The line of the road and the obstacles can be recognized by evaluating the environment data.

The setpoint direction may be derived from a setpoint trajectory for the vehicle. A setpoint trajectory may be prescribed for example by a trajectory planner of the vehicle. The trajectory planner can analyze the environment data, recognize the line of the road and obstacles, and plan the setpoint trajectory along the line of the road and past the obstacles.

The setpoint trajectory may also be prescribed by a navigation system of the vehicle. The navigation system may for example read in a position of the vehicle using a global and/or local positioning system of the vehicle and determine the line of the road at this position with the aid of stored map information. The setpoint trajectory may for example run along a stored traffic lane.

In accordance with an example embodiment of the present invention, the transverse stabilization target may be determined as lying between the steering direction and the setpoint direction. The transverse stabilization target may be a mean value of the steering direction and the setpoint direction. The transverse stabilization target may also represent a fixed ratio of the setpoint direction and steering direction. Determining the transverse stabilization target between the steering direction and the setpoint direction reduces the influence of an erroneous steering direction.

The setpoint direction, when determining the transverse stabilization target, may be weighted dependent on a deviation between the setpoint direction and the steering direction. The greater the deviation, the more greatly can the setpoint direction be weighted. As a result, the influence of the steering direction for minor deviations is greater than for major deviations.

The setpoint direction may be used as the transverse stabilization target if the deviation is greater than a deviation tolerance. If a driver for example over-turns the steering wheel in a panic, the use of the setpoint direction as the transverse stabilization target can possibly prevent the vehicle from running off the road. The deviation tolerance may for example be 30° or less. In particular, the deviation tolerance may be 15° or less.

In accordance with an example embodiment of the present invention, the setpoint direction may be used to determine the transverse stabilization target if a confidence value of the setpoint direction is greater than a threshold value. A confidence value can express a probability that the setpoint direction will be recognized correctly. If for example sensors used to recognize the setpoint direction are restricted in their performance, the confidence value may be lower than if the sensors produce full performance. The confidence value can be read out in particular from the trajectory planner, which can provide a confidence of the setpoint trajectory. The threshold value may be for example 80 percent or more confidence. In particular, the threshold value may be 90 percent or more confidence.

The method in accordance with the present invention may be implemented for example in software or hardware or in a hybrid form of software and hardware for example in a control unit.

The present invention further provides a control unit that is configured to perform, control or implement the steps of a variant of the method of the present invention in corresponding devices.

The control unit may be an electrical device having: at least one arithmetic unit for processing signals or data, at least one memory unit for storing signals or data, and at least one interface and/or one communication interface for reading in or outputting data that are embedded in a communication protocol. The arithmetic unit may for example be a signal processor, a so-called system ASIC or a microcontroller for processing sensor signals and outputting data signals dependent on the sensor signals. The memory unit may be for example a flash memory, an EPROM or a magnetic memory unit. The interface may be configured as a sensor interface for reading in the sensor signals from a sensor and/or as an actuator interface for outputting the data signals and/or control signals to an actuator. The communication interface may be configured to read in or output the data wirelessly and/or in a wired manner. The interfaces may also be software modules which for example are present on a microcontroller in addition to other software modules.

A computer program product or computer program with program code which can be stored on a machine-readable support or storage medium such as a semiconductor memory, a hard disk memory or an optical memory and is used to perform, implement and/or control the steps of the method according to one of the specific embodiments described above is also advantageous, in particular if the program product or program is executed on a computer or a device.

It is pointed out that some of the possible features and advantages of the present invention are described herein with reference to different specific example embodiments. A person skilled in the art will recognize that the features of the control unit and of the method can be suitably combined, adapted or replaced in order to arrive at further specific embodiments of the present invention.

BRIEF DESCRIPTION OF THE DRAWING

Below, specific example embodiments of the present invention will be described with reference to the FIGURE: neither the FIGURE nor the description are to be interpreted as restricting the present invention.

FIG. 1 shows a representation of a vehicle with a control unit in accordance with one example embodiment of the present invention.

The FIGURE is merely schematic and not true to scale. Identical reference numerals designate identical features or features having the same effect in the FIGURE.

DETAILED DESCRIPTION OF EXAMPLE EMBODIMENTS

FIG. 1 shows a representation of a vehicle 100 with a control unit 102 in accordance with one embodiment. The control unit 102 is connected to a transverse stabilization system 104 of the vehicle 100 and configured to control the transverse stabilization system 104. The control unit 102 for this purpose reads in a steering direction 106 of the vehicle 100 and also a setpoint direction 108 of the vehicle 100 and, using the steering direction 106 and the setpoint direction 108, determines a transverse stabilization target 110 for the transverse stabilization system 104.

The steering direction 106 in this case represents a steering angle that is prescribed by a driver of the vehicle 100 via a steering wheel 112 of the vehicle 100 and/or by an assistance system 114 of the vehicle 100. The setpoint direction 108 represents a safe direction of movement for the vehicle 100. The setpoint direction 108 is prescribed in particular by a line of the road 116 and obstacles 118 in the line of the road 116. The obstacles may be other vehicles and/or objects in the line of the road 116 or alternatively next to the line of the road 116. The transverse stabilization target 110 marks a direction in which the transverse stabilization system 104 stabilizes the vehicle 100. With the approach presented here, the transverse stabilization target 110 may deviate from the steering direction 106.

If the vehicle 100 begins to skid for example due to a driving error of the driver or an environmental factor, the transverse stabilization system 104 can produce a stabilizing yawing moment by targeted braking interventions and/or drive interventions on selected wheels of the vehicle 100. The yawing moment then counteracts a rotary movement of the vehicle 100. The transverse stabilization target 110 prescribes to the transverse stabilization system 104 the direction in which a front end of the vehicle should point after the braking interventions and/or drive interventions.

The driver can himself attempt to stabilize the vehicle by steering interventions. In this case, he may however steer too hard and thereby intensify the skidding still further instead of stabilizing the vehicle. Likewise, the driver in the stressful situation of skidding may steer wrongly and steer the vehicle 100 towards an obstacle 118. The steering interventions may also be controlled by assistance systems of the vehicle 100. In the event of the assistance systems being set badly, the prescribed steering direction 106 may likewise intensify the skidding or steer the vehicle 100 onto an obstacle.

With the approach presented here, both the steering direction 106 and the setpoint direction 108 are taken into account in order to determine the transverse stabilization target 110. In this case, the transverse stabilization target 110 may lie between the steering direction 106 and the setpoint direction 108.

In one embodiment, the setpoint direction 108 is read in from a trajectory planner 120 of the vehicle 100. The trajectory planner 120 establishes a safe setpoint trajectory 122 for the vehicle 100 through an area surrounding the vehicle 100. The setpoint direction is derived from the setpoint trajectory 122 in the region of the vehicle 100. To define the setpoint trajectory 122, an environment capture system 124 of the vehicle 100 detects the surrounding area and images it in environment data 126. The trajectory planner 120 reads in the environment data 126, recognizes the line of the road 116 and also the obstacles 118 in the surrounding area and plots the safe setpoint trajectory 122 along the line of the road 116 and around the obstacles 118.

In one example embodiment, the setpoint direction 108 is read in directly from the environment capture system 124. Here the line of the road 116 and the obstacles 118 are recognized directly in the environment capture system 124 and the setpoint direction 108 is adapted to the line of the road 116 and the obstacles 118.

In one example embodiment, the setpoint direction 108 is determined using map data and a vehicle position. The map data image the line of the road 116 in the area surrounding the vehicle 100. Due to the vehicle position, the line of the road 116 ahead of the vehicle 100 is known and the setpoint direction 108 is derived from the line of the road.

In one example embodiment, the setpoint direction 108 is only taken into account if it is recognized with a sufficient degree of certainty. The degree of certainty of recognition of the setpoint direction 108 is represented by a confidence value 128 of the setpoint direction 108. In this case, the setpoint direction 108 is recognized with greater certainty, the higher the confidence value 128 is. The setpoint direction 108 is only used to determine the transverse stabilization target 110 if the confidence value 128 is greater than a threshold value 130. The threshold value 130 may for example be 80% confidence.

In one embodiment, the setpoint direction 108 may be taken into account all the more, the greater a deviation 132 between the steering direction 106 and the setpoint direction 108 is. Thus the driver can feel minor deviations 132 and correct them himself, while major deviations 132 are corrected by the control unit 102.

In one embodiment, from a predetermined deviation 132 onwards exclusively the setpoint direction 108 is used as the transverse stabilization target 110. Thus panic reactions and/or errors of the assistance systems can be ignored. For example, from a 30° deviation 132 onwards only the setpoint direction 108 can still be taken into account.

In other words, a use of environment recognition data and/or the trajectory planning is presented for determining the transverse stabilization target for the ESP.

In the transverse stabilization system (=ESP or VDC), understeering and oversteering are prevented by targeted braking interventions and/or drive interventions. To this end, the controller attempts to keep the vehicle aligned in the direction which the driver prescribes by his steering wheel position.

However, there is not always a "setpoint direction" which the driver prescribes, this being the case for example if an assistive or autonomous driving function temporarily has control of the vehicle.

On the other hand, if the driver does have control of the vehicle, it may be the case that the driver in the event of the vehicle swerving himself turns the steering wheel excessively and thus does not fit the steering wheel position with the driver's actual driving goal.

The "setpoint direction" of the vehicle is defined absolutely by the form of the road. Since environment recognition and hence road recognition exists in modern vehicles having assistive and/or autonomous driving functions (automated driver assistance system, ADAS), this recognition is utilized with the approach presented here in order to establish the setpoint target of the transverse stabilization (provided that there is no obstacle on the road). This makes it possible to have an absolutely correct position target of the transverse stabilization which can be arbitrated/rendered plausible with the driver's input.

While the vehicle is being controlled by an automatic function, there is no driver's desired direction. Here the setpoint trajectory of the trajectory planner (vehicle motion control, VMC) can be utilized directly in order to obtain the current setpoint angle of the automated function as the stabilization target.

In the event that the driver currently has control of the vehicle, using the data of the environment recognition also then makes it possible to stabilize the vehicle in the correct direction if the driver himself starts to panic and does not steer the vehicle in the right direction, for example if he over-turns the steering wheel.

In the event that an automatic function currently has control of the vehicle, using the setpoint trajectory, which is indeed based on the environment data and also takes obstacles into account, makes it possible to stabilize the vehicle in the correct direction. Furthermore, the steering request of the automated function is a delayed reaction to the setpoint trajectory. Therefore the use of the setpoint trajectory represents the fastest information about the setpoint direction that is currently necessary. The transverse stabilization can be improved.

With the approach presented here, the information about the current "absolutely correct" setpoint direction of the vehicle (road direction in the case of driver control or setpoint trajectory in the case of automated control of the vehicle) is utilized in the transverse stabilization in order to optimize the setpoint position of the control for the current driving situation.

During driver control, the current direction of the road can be recognized by environment sensors. This direction should be the setpoint direction of the transverse stabilization. The driver steering direction may for example not fit the road exactly because the driver for example overreacts.

The requested steering direction may also be unclear and not necessarily fit the "absolutely correct" setpoint direction to keep the vehicle in the traffic lane. Due to controller dynamics, there may be a chronological offset between the "desired trajectory" and the "currently requested steering angle", in particular because the transverse controllers of the automated function may not be designed for unstable driving situations.

With the approach presented here, the vehicle, despite an unsuitable/erroneous steering position of the driver or an unsuitable steering request, is stabilized in a position appropriate for the situation by an automated function.

Finally, it should be pointed out that terms such as "having", "comprising", etc. do not exclude any other elements or steps, and terms such as "a" or "one" do not exclude a multiplicity.

What is claimed is:

1. A method for operating a transverse stabilization system of a vehicle, the method comprising the following steps:
reading in a steering direction of the vehicle and a setpoint direction of the vehicle;
determining, based on a comparison of the steering and setpoint directions to each other, that there is satisfaction of a condition that a deviation between the steering and setpoint directions is greater than a threshold deviation, indicating that a steering being performed is towards a first target point that is different than a second target point to which the setpoint direction is to lead;
responsive to the satisfaction of the condition, performing the following:
setting a transverse stabilization direction that is different than the steering direction and the setpoint direction, the transverse stabilization direction being towards a third target point that is different than each of the first and second target points, wherein the setting of the transverse stabilization direction is performed such that, a degree, relative to the steering direction, to which the setpoint direction factors into the setting of the transverse stabilization is dynamically adjusted depending on an extent of the deviation between the setpoint direction and the steering direction; and
performing a transverse stabilization automatically steering the vehicle in the transverse stabilization direction.

2. The method as recited in claim 1, wherein the transverse stabilization direction is between the setpoint direction and the steering direction.

3. The method as recited in claim 1, wherein the setting of the transverse stabilization direction is performed such that, the degree, relative to the steering direction, to which the setpoint direction factors into the setting of the transverse stabilization is such that the greater the deviation between the setpoint direction and the steering direction is, the greater is the degree to which the setpoint direction factors into the setting.

4. The method as recited in claim 1, wherein the setpoint direction is used for the setting of the transverse stabilization direction conditional upon that a confidence value of the setpoint direction is greater than a predetermined threshold value.

5. The method as recited in claim 1, wherein the setpoint direction is derived from a recognized line of the road.

6. The method as recited in claim 1, wherein the setpoint direction is determined using an environment capture system of the vehicle.

7. The method as recited in claim 1, wherein the setpoint direction is derived from a setpoint trajectory for the vehicle.

8. A control unit for a transverse stabilization system, the control unit configured to:
read in a steering direction of the vehicle and a setpoint direction of the vehicle;
determine, based on a comparison of the steering and setpoint directions to each other, that there is satisfaction of a condition that a deviation between the steering and setpoint directions is greater than a threshold deviation, indicating that a steering being performed is towards a first target point that is different than a second target point to which the setpoint direction is to lead;
responsive to the satisfaction of the condition, performing the following:
set a transverse stabilization direction that is different than the steering direction and the setpoint direction, the transverse stabilization direction being towards a third target point that is different than each of the first and second target points, wherein the setting of the transverse stabilization direction is performed such that, a degree, relative to the steering direction, to which the setpoint direction factors into the setting of the transverse stabilization is dynamically adjusted depending on an extent of the deviation between the setpoint direction and the steering direction; and
perform a transverse stabilization automatically steering the vehicle in the transverse stabilization direction.

9. A non-transitory machine-readable storage medium on which is stored a computer program for operating a transverse stabilization system of a vehicle, the computer program, when executed by a processor, causing the processor to perform the following steps:
reading in a steering direction of the vehicle and a setpoint direction of the vehicle;
determining, based on a comparison of the steering and setpoint directions to each other, that there is satisfaction of a condition that a deviation between the steering and setpoint directions is greater than a threshold deviation, indicating that a steering being performed is towards a first target point that is different than a second target point to which the setpoint direction is to lead;
responsive to the satisfaction of the condition, performing the following:
setting a transverse stabilization direction that is different than the steering direction and the setpoint direction, the transverse stabilization direction being towards a third target point that is different than each of the first and second target points, wherein the setting of the transverse stabilization direction is performed such that, a degree, relative to the steering direction, to which the setpoint direction factors into the setting of the transverse stabilization is dynamically adjusted depending on an extent of the deviation between the setpoint direction and the steering direction; and
performing a transverse stabilization automatically steering the vehicle in the transverse stabilization direction.

* * * * *